United States Patent [19]

Lewis

[11] 4,088,882

[45] May 9, 1978

[54] FLUORESCENT BIKE LAMP

[76] Inventor: Donald J. Lewis, 5086 Falmouth, Troy, Mich. 48084

[21] Appl. No.: 604,036

[22] Filed: Aug. 12, 1975

[51] Int. Cl.² .......................... H05B 33/02; B62J 5/00
[52] U.S. Cl. ...................................... 362/217; 362/72; 362/192
[58] Field of Search ................ 240/7.55, 7.6, 51.11 R, 240/51.11 A, 58

[56] References Cited

U.S. PATENT DOCUMENTS

| 1,848,235 | 3/1932 | Wiley | 240/58 X |
| 2,233,039 | 2/1941 | Vionzone | 240/7.6 |
| 2,488,021 | 11/1949 | May | 240/7.6 X |
| 3,136,489 | 6/1964 | Oharenko | 240/51.11 X |
| 3,230,360 | 1/1966 | Short | 240/51.11 R |
| 3,242,331 | 3/1966 | Behringer et al. | 240/51.11 X |
| 3,249,749 | 5/1966 | Haas | 240/51.11 R X |
| 3,331,958 | 7/1967 | Adler | 240/51.11 R X |
| 3,539,969 | 11/1970 | Johnson et al. | 240/51.11 R |
| 3,696,334 | 10/1972 | Demeter | 240/7.55 X |
| 3,833,801 | 9/1974 | Trevithick | 240/51.11 R X |
| 3,862,410 | 1/1975 | Maxwell | 240/7.55 |
| 3,890,497 | 6/1975 | Rush | 240/7.55 |

Primary Examiner—Edna M. O'Connor
Attorney, Agent, or Firm—Krass & Young

[57] ABSTRACT

A fluorescent light device for bicycles and other recreational uses comprising a standard fluorescent bulb disposed within a plastic tube and maintained in spaced relationship with the interior walls of said tube by resilient spacers. End caps are adhesively bonded to the tube ends to maintain the assembly in an integral condition. The fluorescent bulb is fired by an ac voltage derived from either an alternator or a battery/inverter combination. A step-up transformer is connected between the alternator and the bulb to achieve firing potential. A tuning capacitor is connected between the transformer secondary winding and the bulb to maximize electrical energy transmission. A short bulb/tube device is adapted for use in combination with a flag having an integral sleeve which fits over the bulb.

16 Claims, 7 Drawing Figures

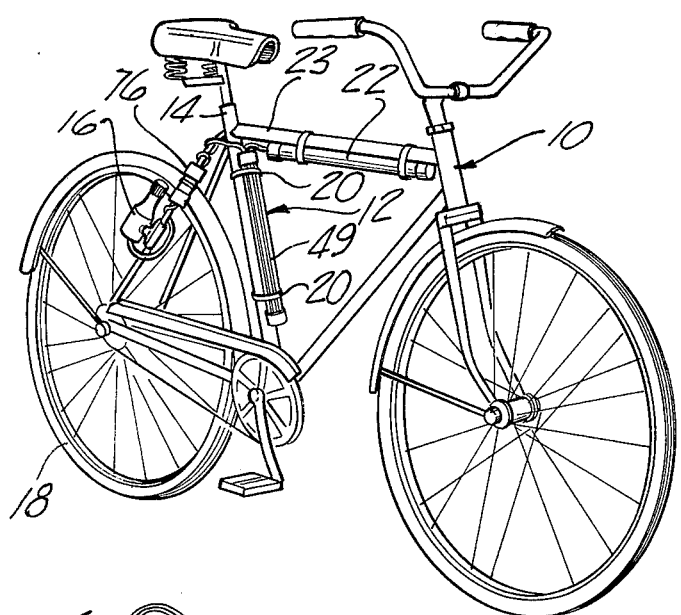
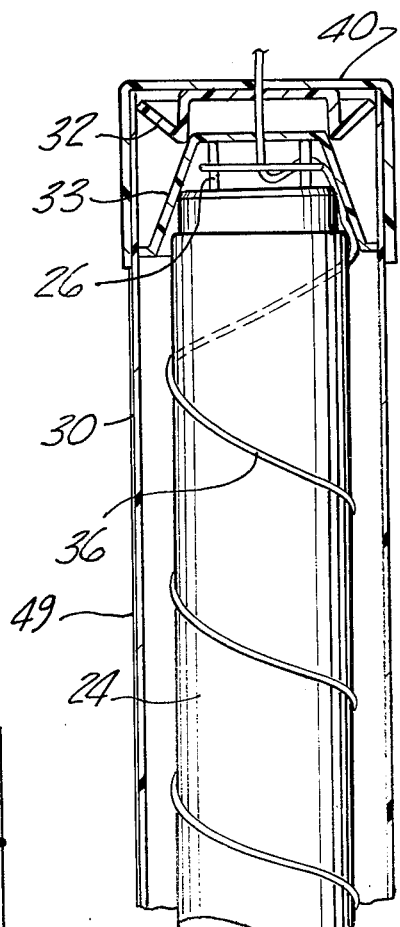
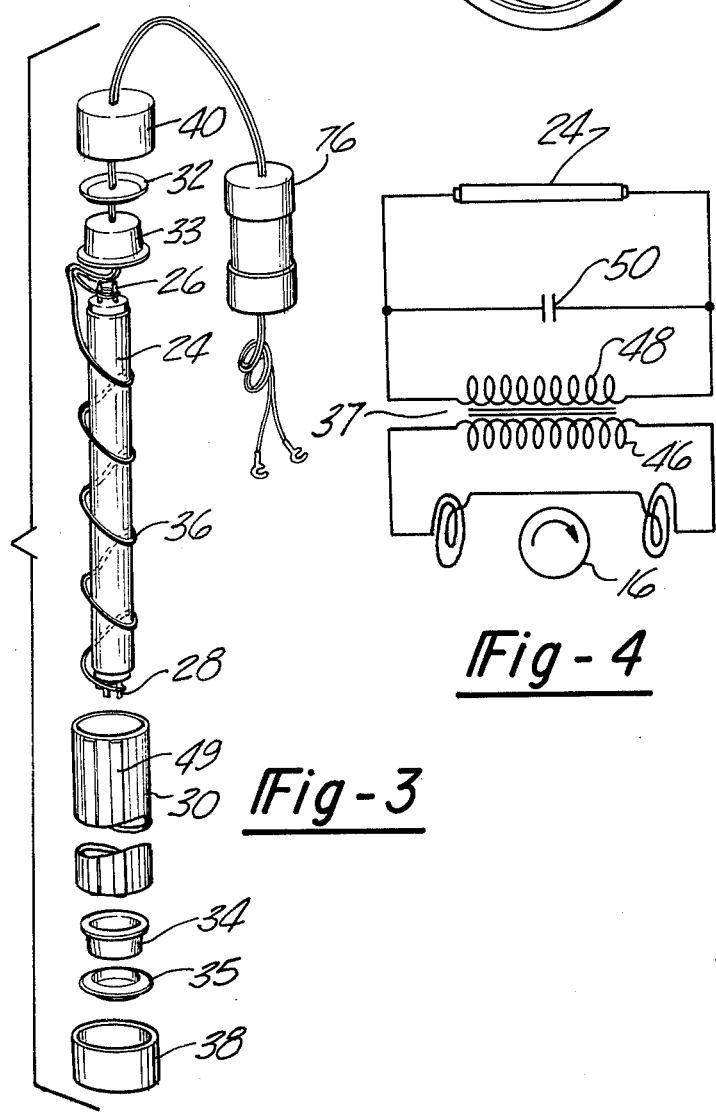
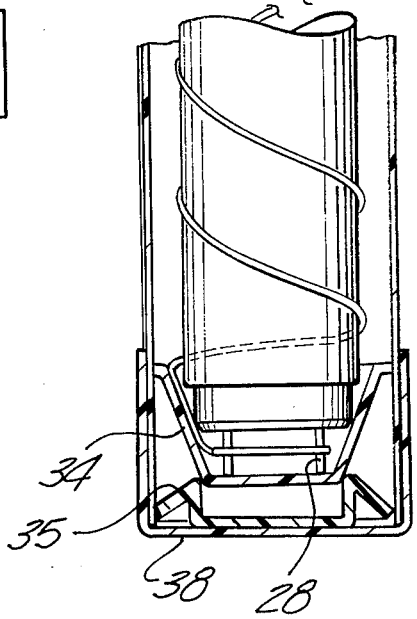

U.S. Patent  May 9, 1978  Sheet 2 of 2  4,088,882
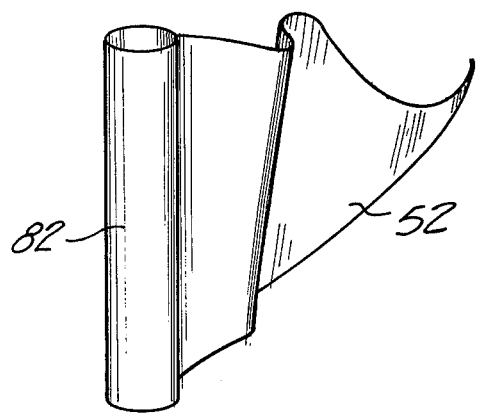
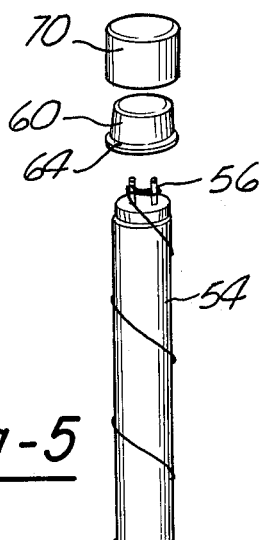
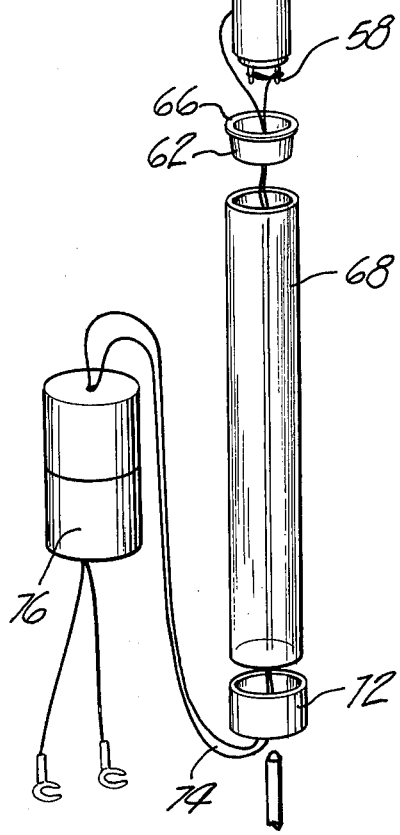
Fig-5
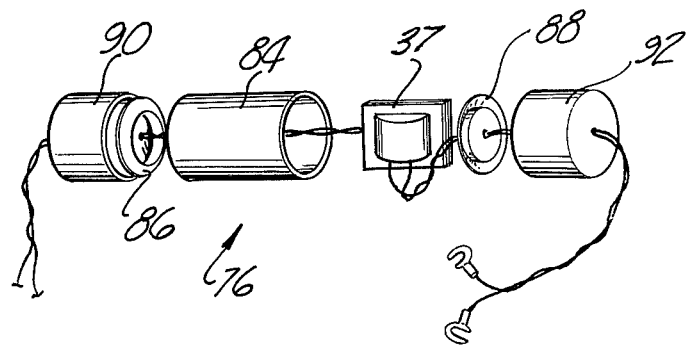
Fig-6
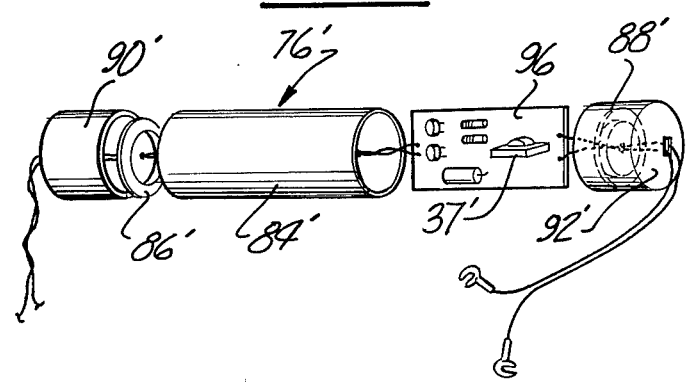
Fig-7

FLUORESCENT BIKE LAMP

INTRODUCTION

This invention relates to recreational lighting devices for bicycles and the like, and more particularly to recreational lighting devices using long-life, high-performance fluorescent bulbs.

BACKGROUND OF THE INVENTION

Recreational lighting devices such as for bicycles and small recreational vehicles typically comprise a small incandescent bulb and reflector combination disposed in a metal or plastic case to produce a substantially focused beam. Such lighting devices are almost entirely powered by less than 15 volts and thus may be energized either by battery or by a vehicle-driven generator.

Such recreational lighting devices, while having been accepted for many years, poses certain deficiencies in that the illumination provided thereby is much too directional for good, all-angle visibility. Moreover, such devices, when used on bicycles and the like, fail to provide a truely eye-catching, illuminated area to warn other persons, such as automobile drivers, of the presence of the bicycle in the traffic area.

BRIEF SUMMARY OF THE INVENTION

The principal object of the present invention is to provide an unfocused substantially omnidirectional, high-performance light source for recreational use, such light source being particularly, but not exclusively, adapted for use on bicycles and other small recreational vehicles. In general, the objects of the invention are accomplished through the use of a light device having a fluorescent bulb of elongate tubular configuration together with means for mounting the device in a substantially breakage-resistant tubular housing and means for connecting the end terminals of the bulb to a source of ac energy of sufficient potential to fire and maintain the illumination of the fluorescent bulb throughout normal vehicle operation.

The lighting device of the subject invention may be either battery or alternator driven, a battery powered embodiment comprising a battery case, inverter and step-up transformer package as well as the light device itself being hereinafter described in substantial detail. The alternator powered device is also hereinafter described as the preferred embodiment, such embodiment comprising a commercially available alternator device and a step-up transformer circuit for direct connection to the end terminals of the bulb as also hereinafter described in greater detail.

The lighting device of the subject invention is particularly adapted for use on and in connection with conventional bicycles. In the specific embodiments hereinafter described, the elongate cylindrical fluorescent tube and the housing therefor is designed to be of such length as to be readily secured to the vertical bicycle frame bar which extends between sprocket housing and seat thus to provide a substantially omnidirectional illumination pattern which assists not only in the operation of the bicycle but which also illuminates the rider thus to provide extremely high visibility and safety in connection with nighttime bicycle operation.

In accordance with another illustrative embodiment of the invention, a high visibility bicycle flag of the type comprising a long flexible whip or shaft with the light mounted at the upper end thereof is provided. In general, this is accomplished through the provision of a smaller, short-length bulb and protective tube package together with a transformer "pill" which is separate from the bulb package so as to be mounted either on the bike frame or lower on the flag whip to reduce the concentration of mass at the upper end thereof. In the preferred form, the bike flag comprises a translucent flag having a sleeve portion formed along the terminal boundary thereof so as to slide over the fluorescent tube package for mounting purposes. In this embodiment, the flag itself is illuminated by the bulb so as to become a high visibility source of light which draws attention to the bicycle and rider during nighttime operation.

These and other features and advantages of the present invention will be best understood from a reading of the following specification in which specific embodiments are described in detail.

BRIEF DESCRIPTION OF THE DRAWINGS

FIG. 1 is a perspective view of a conventional bicycle having an illustrative embodiment of the present invention mounted thereon;

FIG. 2 is a side view in section of an illustrative embodiment of the lighting device of the invention;

FIG. 3 is an exploded view of the principal components of the structure of FIG. 2;

FIG. 4 is an electrical circuit diagram of the device of FIG. 2 having an alternator power source;

FIG. 5 is an exploded drawing of a fluorescent lighted flag device embodying the invention;

FIG. 6 is an exploded drawing of a power pill assembly including a step-up transformer for alternator driven devices; and FIG. 7 is an exploded drawing of a power pill assembly including an inverter circuit card for battery driven applications.

DETAILED DESCRIPTION OF THE SPECIFIC EMBODIMENT

FIG. 1 shows a conventional light-weight bicycle 10 having a fluorescent light device 12 mounted on the vertical framebar 14 and connected to receive alternating current energization from a frame-mounted alternator 16 via a transformer pack 76. The alternator 16 comprises a knurled pinion which may be set against the side wall or tread of bicycle tire 18 to produce alternating current potential as will be apparent to those skilled in the art. Satisfactory alternator devices are commercially available. The light device 12 is secured to the framebar 14 by means of plastic ties 20 of the self-locking type now in common use; or by such other means as may be desired.

The drawing of FIG. 1 further illustrates a battery pack 22 secured to and beneath the horizontal framebar 23 of bicycle 10 to provide an alternative source of potential for the light device 12. It is to be understood that the subject device will normally comprise either the generator 16 or the battery pack 22; however, combination systems are possible thereby to provide generator power during normal bike operation and battery power whenever the bike is stopped.

FIGS. 2 and 3 illustrate the components of the bike light 12 in detail. Light 12 comprises a conventional fluorescent bulb 24 such as an F15T8-Green which is available from commercial manufacturers including General Electric, Sylvania, and others. This is a 15-watt fluorescent bulb of approximately 18 inches in length so as to fit along bar 14 between seat and sprocket housing and of elongate cylindrical configuration, having end terminals 26 and 28 for receiving an alternating energizing voltage. Although green is preferred, other colors including clear glass may be employed.

Bulb 24 is substantially permanently enclosed within a cylindrical tube 30 of breakage-resistant, light-transmitting plastic such as cellulose acetate butyrate (CAB), a clear, fairly rigid polymeric material. Bulb 24 is held in place by plastic spacer assemblies 32, 33 and 34, 35 at the opposite ends thereof. Spacers 33 and 34 are deeply cup-shaped to receive the bulb ends. Spacers 32 and 35 are shallow to receive the spacers 33 and 34. Both types of spacers have peripheral flanges to maintain the proper radial spacing; however, the flange of spacers 33 and 34 is fairly stiff while the flange of spacers 32 and 35 is flexible to bend back upon insertion in the manner shown so as to be dished reversely to the direction of insertion. The diameter of tube 30 is such as to provide a spacing of approximately ¼ between the glass envelope of the bulb and the interior surface of the tube, thus, to ensure, along with the shock absorbing spacers, a highly breakage-resistant package which fully isolates the bulb 24 against direct blows such as might otherwise be encountered should bicycle 10 be accidentally tipped over or otherwise abused. Two-conductor wire 36 extends from the alternator 16 as shown in FIG. 1 to a step-up transformer 37 disposed within the pill 76 as shown in FIGS. 2 and 3 and thence to the end terminals 26 and 28 of bulb 24. A length of two-conductor wire 36 is wrapped around the outside of the bulb 24 to reach the lowermost terminals 28 as shown in FIG. 2. End cap 38 is secured such as by adhesive bonding to the lower end of tube 30 while end cap 40 is placed over and adhesively bonded to the upper end of tube 30 end cap 40 engaging the end wall of spacer 32, and end cap 38 engaging the end wall of spacer 35 as shown in FIG. 2. By this assembly the bulb 24 is securely held in place and insulated from possible damage both axially and radially. Spacers 32, 33, 34 and 35 maintain flexibility throughout a wide temperature range and will not loosen with age like polyethylene foam. Spacers 33 and 34 provide electrical insulation around the end terminals 26 or 28. End caps 38 and 40 are preferably polyethylene or vinyl. Spacers 32, 33, 34 and 35 are preferably polyethylene.

The advantages of the use of a plastic tube 30 and spacer assemblies are several. First the tube, as previously described, is selected to be of such length and diameter as to fully enclose bulb 24 and to permit the bulb to be disposed in spaced relationship thereto. Thus, the bulb 24 is protected against breakage during normal operation of the bicycle 10 or such other recreational vehicle as may be equipped with a lighting device 12 of the type shown in the drawings. Secondly, should the bulb 24 be broken due to severe abuse, the broken glass fragments are wholly contained within the tube 30 where they cannot inflict injury upon the rider or such other persons as may be involved in minor bicycle collisions, accidents and the like. Although the bulb 24 is substantially permanently encapsulated within tube 30, the commercial economics of the device 12 are not materially diminished since a bulb 24 of the type previously identified operated at approximately 10-watts has been shown to exhibit 6000 hours of useful life or approximately 14 years of normal nighttime bicycle use.

FIG. 4 shows the circuit for the energization of bulb 24 in greater detail. Alternator 16 is shown as a conventional dynamo connected across the primary winding 46 of step-up transformer 37. The secondary winding 48 of transformer 37 is connected across a large capacitor 50 which in turn is connected across the end terminals of bulb 24 for direct excitation of the fluorescent bulb by the secondary voltage. Transformer 37 is preferably of the silicon steel core type having an E core form and a primary winding consisting of approximately 5000 turns of No. 40 wire, a secondary winding consisting of approximately 290 turns of No. 28 wire; it being understood that these wire sizes and turn numbers may be varied according to the selection of the fluorescent lamp, the alternator 16 and so forth. The length of wire 36 extending along the side of the lamp 24 is preferably wound around the lamp from 3 to 5 times before making connection to the lower electrodes or end terminals 28 to improve the low speed operation of the device 12. Capacitor 50, it will be noted, receives voltage from both alternating half-cycles of the waveform across the secondary winding 40 and, hence, receives no average charge for application to lamp 24. Capacitor 50, thus, serves a tuning function so as to promote the efficient transfer of electrical energy from transformer 37 to bulb 24. Assuming a transformer of the type described and an alternator 16 capable of generating from 6 to 12 volts ac, a capacitor of approximately 0.05 ufd has been found to provide satisfactory operation in connection with F15T8-Green fluorescent bulb 24. A start-up secondary voltage of approximately 285 volts and a run voltage of approximately 90 volts across secondary 48 have been found satisfactory. Such a device 12 produces approximately 1500 lumens output from bulb 24. The preferred color for bulb 24 is, as previously stated, green, with considerable output in the ultraviolet portion of the spectrum thus to fully and brightly illuminate the rider of bicyle 10. It has been found that when a rider wears a shirt which has been washed in a detergent having optical brighteners, a phosphorescent effect can be noted adding significantly to the effectiveness of the nighttime lighting of device 12.

Light 12 may be multi-colored by the bonding of colored translucent strips 49 to the outside (or inside) of the tube. A preferred pattern is yellow on the sides of the light, red to the rear and clear or green ahead.

FIG. 5 illustrates a second application of the invention to a flag stick-mounted fluorescent bulb; i.e., a light adapted to be carried on the upper end of the currently popular bicycle safety flag stick 51 and accompanied by a brightly colored pennant or flag 52 for both daytime and nighttime visibility.

The embodiment of FIG. 5 comprises 5-inch fluorescent bulb 54 having end terminals 56 and 58 disposed in and through molded plastic spacers 60 and 62 having radial flanges 64 and 66, respectively, which fit within the ends of a clear plastic protective tube 68. Again, tube 68 is of such diameter length as to fully enclose the bulb 54 and to maintain a spaced relationship with the glass envelope of the bulb 54 by virtue of the flanges 64 and 66 on the spacers 60 and 62, respectively. Spacers 60 and 62 are substantially the equivalent of spacers 33 and 34 in the embodiment of FIG. 2. End caps 70 and 72 are adhesively bonded on to the ends of the tube 68 after the bulb 54 in spacers 60 and 62 are properly inserted. Two-conductor wire 74 is again connected through the lower end cap 72 to the end terminals 56 and 58 of the bulb 54.

Like the embodiment of FIG. 2, the transformer for providing a voltage sufficient to fire the bulb 54 is within a "pill" 76 which is susceptible of location remotely from the tube 68 and bulb 54. This avoids a concentration of mass at the upper end of the typically flexible bicycle flag stick now in common use. It is contemplated that two-conductor wire 74 is of sufficient length as to permit the bulb 54 and tube 68 to be strapped or otherwise secured to the upper end of the flag stick with the pill 76 disposed on the rear wheel frame of the bicycle 10 near the alternator 16 as shown in FIG. 1. In such an embodiment, it is preferable to have the conductor 74 spirally wound so as to conveniently fit around the flag stick. Pill 76 is provided with conductor 78 having terminals 80 which are readily connected to the alternator 16 shown in FIG. 1.

Flag 52 is preferably formed out of a weather-resistant polymeric material such as nylon or fiberglass and provided with a sleeve 82 extending along the side thereof and of such dimension as to fit snugly over the tube 68 of the flag light. In this configuration the flag itself is substantially part of the illuminated area giving a highly visible effect during normal nighttime operation. A flag of fluorescent orange, semi-translucent plastic fabric has been found to provide excellent results; the fluorescent pigments reacting photo-energetically with the ultraviolet output from the lamp to provide secondary light output in the visible spectrum and increase brightness; however, other fabrics and colors may, of course, be employed.

FIG. 6 illustrates a preferred construction for pill 76. In FIG. 6 the pill comprises a short tube 84 of clear plastic material such as cellulose acetate butyrate, a pair of spacers 86 and 88 of such dimension as to fit snugly within the tube 84 so as to secure in place the transformer 35 which is electrically connected to the capacitor 50 and the end terminals of bulb 54 as previously described. End caps 90 and 92, each of approximately one-half of the overall length of tube 84 are adapted to be disposed over the outer surface of tube 84 and to be adhesively bonded thereto to complete the package. When the length considerations immediately set forth above are observed, the opaque end caps 90 and 92 fully conceal the transformer 35 which is within the clear plastic tube 84 while at the same time permitting the same material to be used for both tubes 84 and 68. The central apertures in each of the components 86, 88, 90 and 92 may be readily formed either in the molding process or subsequently thereto by punching. Molded plastic components are contemplated, however, it is possible to use certain other materials for the end caps 90, 92, such as light-weight metals.

FIG. 7 shows an alternative configuration for the pill 76' this time to enclose a printed circuit card 96 bearing a conventional solid-state inverter circuit for converting dc signal from the battery pack 22 to an ac signal for application to the step-up transformer 37 and thence to the bulb 24 of the bike light 12 shown in FIGS. 1 through 3. Pill 76' comprises a tube 86' of cellulose acetate butyrate material, spacers 86' and 88' and end caps 90' and 92' to complete the package in substantially the same fashion as was described with reference to FIG. 6. Note that the spacers 86, 88, 86' and 88' are all provided with a reversely dished flange portion which acts as a spring to permit the spacers to be easily inserted into the CAB tube but which tend to lock and resist withdrawal thereof in reverse direction. Thus, a secure locking action is provided to maintain the components held between the spacers securely in place.

Variations in the specific implementation of the invention including the use of various types of switches, dc generators, other types of fastening devices, and so forth, will be apparent to those skilled in the art. Accordingly, the foregoing description is to be considered illustrative rather than limiting in sense.

The embodiments of the invention in which an exclusive property or privilege is claimed are defined as follows:

1. A recreational light device comprising: an elongate cylindrical fluorescent bulb having end terminals; an elongate cylindrical tube of breakage-resistant light transmitting material having a length and diameter greater than those of bulb, spacer means disposed in each end of said cylindrical tube, each of said spacer means receiving a respective end of said bulb and maintaining the bulb in substantially coaxial disposition within and spaced from said tube, said spacer means being axially and radially flexible to thereby protect said bulb from impacts on said cylindrical tube and power means electrically exciting said bulb, said means including at each end of the bulb a flexible spacer having a cup-shaped body and a peripheral flange at the open end thereof, the flange being in contact with the inner surface of the tube.

2. Apparatus as defined in claim 1 further including end caps secured over and bonded to the ends of said tube.

3. Apparatus as defined in claim 2 wherein said power means includes conductor means extending through one of said end caps to said end terminals and being coiled around said bulb over the length thereof.

4. Apparatus as defined in claim 1 wherein said tube is constructed of a substantially clear plastic material.

5. Apparatus as defined in claim 1 wherein said power means includes a transformer having primary and secondary windings, means for connecting the primary winding to a source of electrical potential and capacitor means connecting the secondary winding across the end terminals of said bulb for direct excitation of said bulb by the voltage appearing across said secondary winding.

6. Apparatus as defined in claim 5 including package means separate from said tube for containing said transformer.

7. Apparatus as defined in claim 6 wherein said package means, comprises a short cylindrical tube of substantially rigid plastic material, a pair of spacers disposed in the ends of said tubes and a pair of end caps disposed over and secured to the ends of said tube.

8. Apparatus as defined in claim 1 wherein said power means includes a transformer, and also includes inverter circuit means, and means electrically connecting the inverter circuit mens between a dc energy source and the primary winding of said transformer.

9. Apparatus as defined in claim 8 further including a battery case for providing a dc energization to said inverter circuit.

10. Apparatus as defined in claim 1 including means for securing said light device to a framebar of a bicycle.

11. Apparatus as defined in claim 1 wherein said bulb is of a length of approximately 5 inches thus to be securable to the free end of a bicycle flag stick.

12. Apparatus as defined in claim 10 further including a transformer package separate from said light device and interconnected therewith by conductor means of sufficient length as to permit the light device to be mounted on the free end of a bicycle end flag stick and the transformer device to be mounted on the bicycle frame.

13. Apparatus as defined in claim 11 further including a flag having a sleeve portion adapted to be wrapped around said tube.

14. Apparatus as defined in claim 1 wherein said bulb is green.

15. The light device according to claim 1 wherein said spacer means further includes another flexible spacer at each end having a cupped body receiving a respective one of said one flexible spacer, each of said another spacer having a dished flange formed thereon being in contact with the inner surface of said tube.

16. The light device according to claim 15 further including a pair of end caps disposed on either end of said cylindrical tube and engaging a respective end wall of each of said cupped body of each of said another flexible spacers.

* * * * *